US012135102B2

(12) United States Patent
Cochran

(10) Patent No.: US 12,135,102 B2
(45) Date of Patent: Nov. 5, 2024

(54) SWIVEL CONNECTOR

(71) Applicant: Axis Forestry Inc., Kamloops (CA)

(72) Inventor: Wayne E. Cochran, Kamloops (CA)

(73) Assignee: Axis Forestry Inc., Kamloops (CA)

( * ) Notice: Subject to any disclaimer, the term of this patent is extended or adjusted under 35 U.S.C. 154(b) by 0 days.

(21) Appl. No.: 18/113,305

(22) Filed: Feb. 23, 2023

(65) Prior Publication Data

US 2024/0288105 A1 Aug. 29, 2024

(51) Int. Cl.
*F16L 27/087* (2006.01)
*F16L 39/04* (2006.01)

(52) U.S. Cl.
CPC ............. *F16L 27/087* (2013.01); *F16L 39/04* (2013.01)

(58) Field of Classification Search
CPC .................................. F16L 39/04; F16L 27/087
See application file for complete search history.

(56) References Cited

U.S. PATENT DOCUMENTS 3,380,350 A * 4/1968 Stewart .................... F16L 39/04
4,928,997 A * 5/1990 Reisener ................. F16L 39/04

2005/0046181 A1 * 3/2005 Falconer ............... F16L 27/087
2005/0051088 A1 * 3/2005 Arnold ..................... F16L 39/04
2008/0179482 A1 * 7/2008 van Amelsfoort ....... F16L 39/04
2017/0074445 A1 * 3/2017 Kikuyama .............. F16L 39/04
2022/0136208 A1 * 5/2022 Okada ................... F16L 27/087

FOREIGN PATENT DOCUMENTS

EP           0570734 A1 *  4/1993  ............. F16L 27/087
WO    WO-02097318 A1 * 12/2002  ............. F16L 39/04

* cited by examiner

*Primary Examiner* — Zachary T Dragicevich
(74) *Attorney, Agent, or Firm* — Nexus Law Group; Nicholas P. Toth

(57) ABSTRACT

A swivel connector includes: an inner body having a first end and a second end opposite to the first end, the inner body defining an inner port at the second end for receiving a first fluid connection; and an outer body captively rotatable about the inner body, the outer body defining an outer port for receiving a second fluid connection, the inner body and the outer body cooperatively defining an annular passage therebetween, and the inner port extending within the inner body to the annular passage and the outer port extending within the outer body to the annular passage so as to form a passageway operable to permit a flow of fluid between the inner port and the outer port. The swivel connector of the present invention permits a first connected hose to swivel about a first axis that is perpendicular to a second axis with a second connected hose.

14 Claims, 13 Drawing Sheets

SWIVEL CONNECTOR

BACKGROUND OF THE INVENTION

1. Field of Invention

This invention relates to connective joints and, in particular, to swivel connectors.

2. Description of Related Art

Fluid transfer hoses are typically used to transport fluids over a distance. Accordingly, fluid transfer hoses are manufactured with longer lengths or multiple hose segments are connected together to traverse those distances. When these longer lengths of hoses or connected segments of hoses are used, they are more prone to twisting and kink formation. Kinks are formed in hoses when one end of the hose rotates opposite to the other end. Hose kinking reduces flow, increases system pressure, and causes wear and tear of hose walls and end connectors. To address these issues, swivel joints are conventionally used. Swivel joints allow two connected hoses or other attachments to rotate independently from each other, thus reducing issues of reduced flow, increased system pressure and the wear and tear from kink formation.

In certain applications, conventional swivel joints are not able to adequately prevent twisting of the fluid transfer hoses or are not suitable for the desired use case. For example, in machinery used for harvesting trees, multiple hydraulic hoses run along the length of a boom to connect with a forestry processor head, and forestry processor heads are required to tilt and rotate on various axes in order to securely grip and harvest a tree. Thus, there is a need for a swivel joint that changes the axis of rotation of attached hydraulic hoses and thus redirects attached hydraulic hoses in a preferred direction.

SUMMARY

The above shortcomings may be addressed by providing, in accordance with one aspect of the invention, a swivel connector. The swivel connector includes: an inner body having a first end and a second end opposite to the first end, the inner body defining an inner port at the second end for receiving a first fluid connection; and an outer body captively rotatable about the inner body, the outer body defining an outer port for receiving a second fluid connection, the inner body and the outer body cooperatively defining an annular passage therebetween, and the inner port extending within the inner body to the annular passage and the outer port extending within the outer body to the annular passage so as to form a passageway operable to permit a flow of fluid between the inner port and the outer port.

The inner body may further define a second inner port spaced apart from inner port, the outer body may further define a second outer port spaced apart from outer port, and wherein the inner body and the outer body may cooperatively define a second annular passage spaced apart from annular passage so as to form a second passageway from the second inner port to the second outer port.

The inner body may further define a first annular groove and the outer body may define a second annular groove, the first and second annular grooves may define the annular passage.

The second outer port, second annular passage, second passageway, and second inner port may be larger than outer port, annular passage, passageway, and inner port, respectively.

The passageway may include a right-angle bend.

The swivel connector may further include one or more bearings disposed between the inner body and the outer body.

The swivel connector may further include one or more circumferential seals for sealing the annular passage.

The swivel connector may include a mounting plate removeably attachable to the inner body. The mounting plate may be removeably attached to the inner body at the first end, the inner body may define a flange at the second end, and wherein the mounting plate and the flange may cooperatively render the outer body captive to the inner body.

Each of the first and second fluid connections may be a hose coupling.

In accordance with another aspect of the invention, there is provided a swivel connector. The swivel connector includes an inner body having a first end and a second end opposite the first end, the inner body defining an inner port at the second end for receiving a first fluid connection, the inner body further defining a longitudinal cutout extending from the first end to the second end; and an outer body captively rotatable about the inner body, the outer body defining an outer port for receiving a second fluid connection, the inner body and the outer body cooperatively defining an annular passage therebetween, the inner port extending within the inner body to the annular passage and the outer port extending within the outer body to the annular passage, the outer body further defining a wire port, the longitudinal cutout and the wire port operable to permit an electrical wire to pass through the swivel connector. The guide may extend from the longitudinal cutout at the first end of the inner body to the wire port. The guide may have a right-angle bend.

In accordance with another aspect of the invention, there is provided an apparatus for mounting a forestry processor head to a boom, the apparatus including a swivel connector according to embodiments disclosed herein, the apparatus further including: a support having a first support end and a second support end; and a second swivel connector pivotally mounted to the support at the first support end, second swivel connector permitting the support to pivot about a first axis; wherein the swivel connector is mounted to the support at the second support end, swivel connector permitting the swivel connector to pivot about a second axis perpendicular to the first axis.

The apparatus may further include: a first mounting mechanism connected to second swivel connector for mounting second swivel connector to the boom; and a second mounting mechanism connected to the second support end for pivotally mounting the forestry processor head to the second support end.

The foregoing summary is illustrative only and is not intended to be in any way limiting. Other aspects and features of the present invention will become apparent to those of ordinary skill in the art upon review of the following description of embodiments of the invention in conjunction with the accompanying figures and claims.

BRIEF DESCRIPTION OF THE DRAWINGS

In drawings which illustrate by way of example only embodiments of the invention.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Referring to FIGS. 1 to 7, the swivel connector according to a first embodiment of the invention is shown generally at 10. Swivel connector 10 includes an inner body 12 and an outer body 14. Swivel connector 10 is designed for use in a forestry processing apparatus and may be adapted to any other desired commercial or industrial installation.

Figure 1:
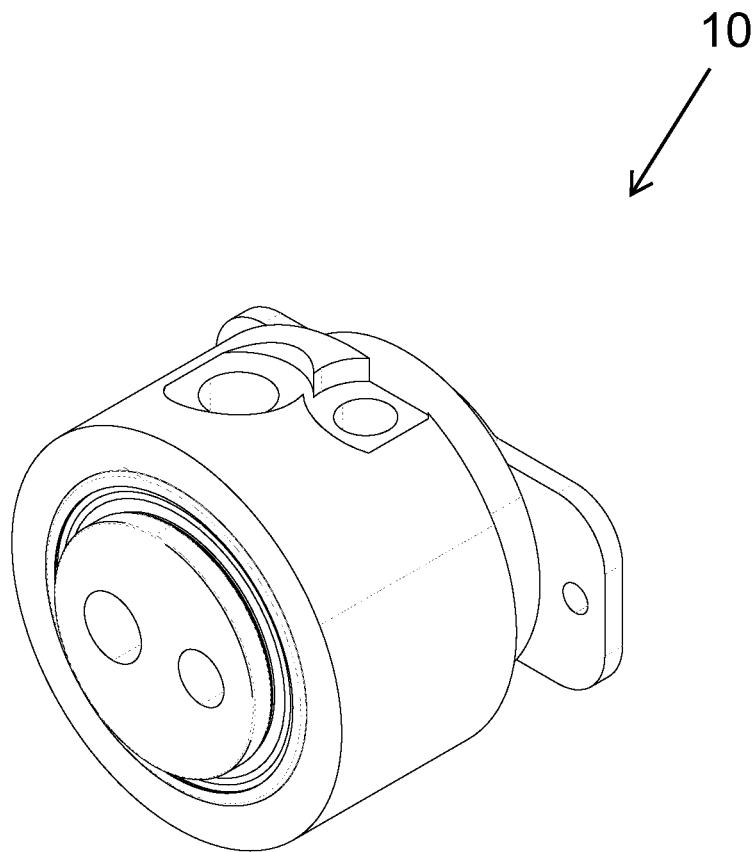
FIG. 1 is a perspective front view of a swivel connector according to a first embodiment of the invention.
Figure 2:
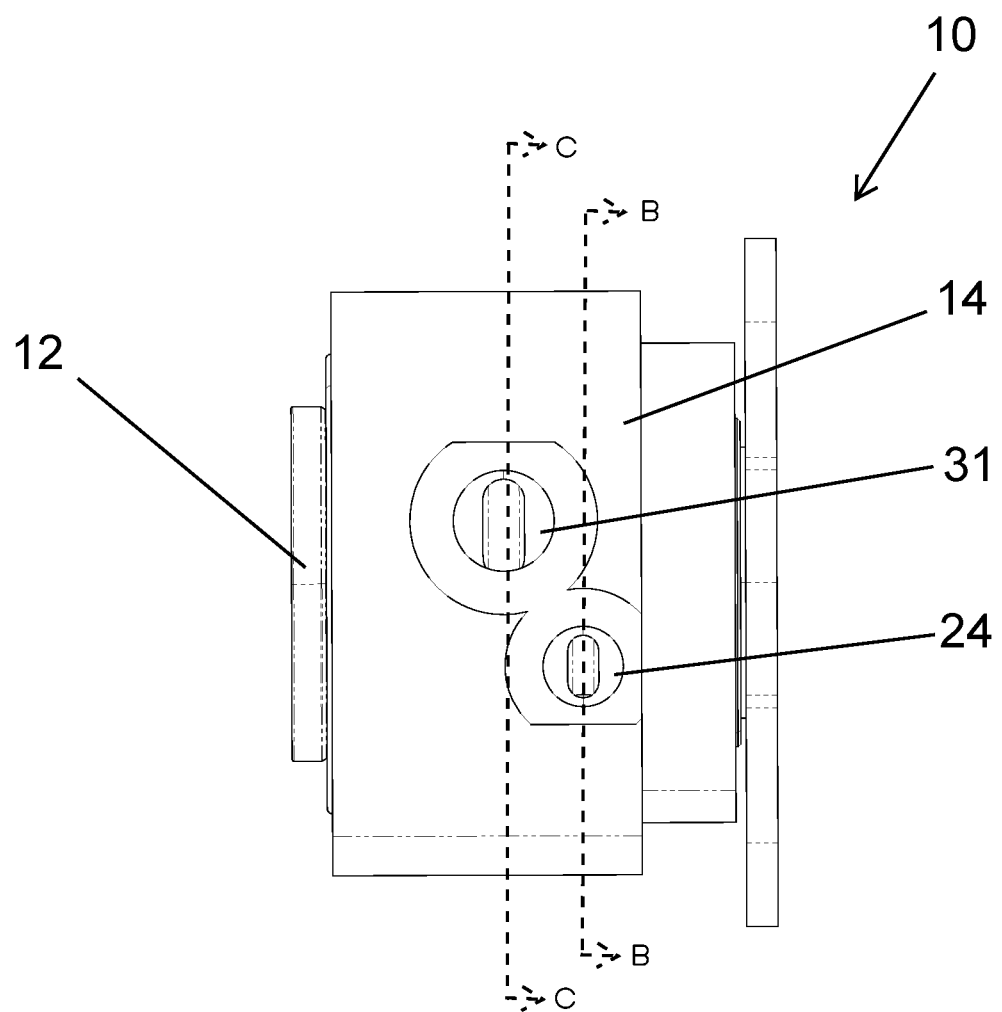
FIG. 2 is a front view of the swivel connector shown in FIG. 1.
Figure 3:
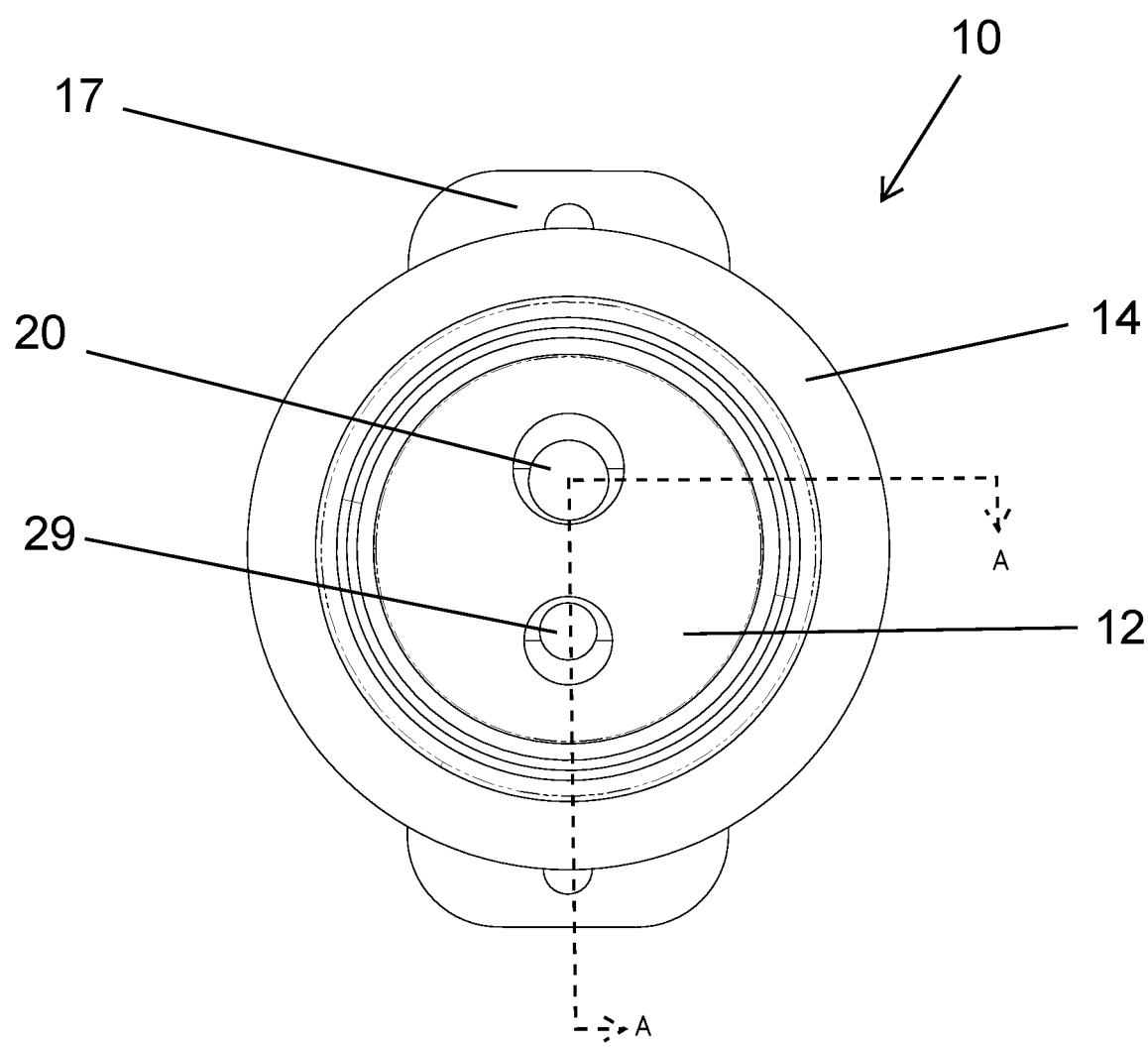
FIG. 3 is a left side view of the swivel connector shown in FIG. 1.
Figure 5:
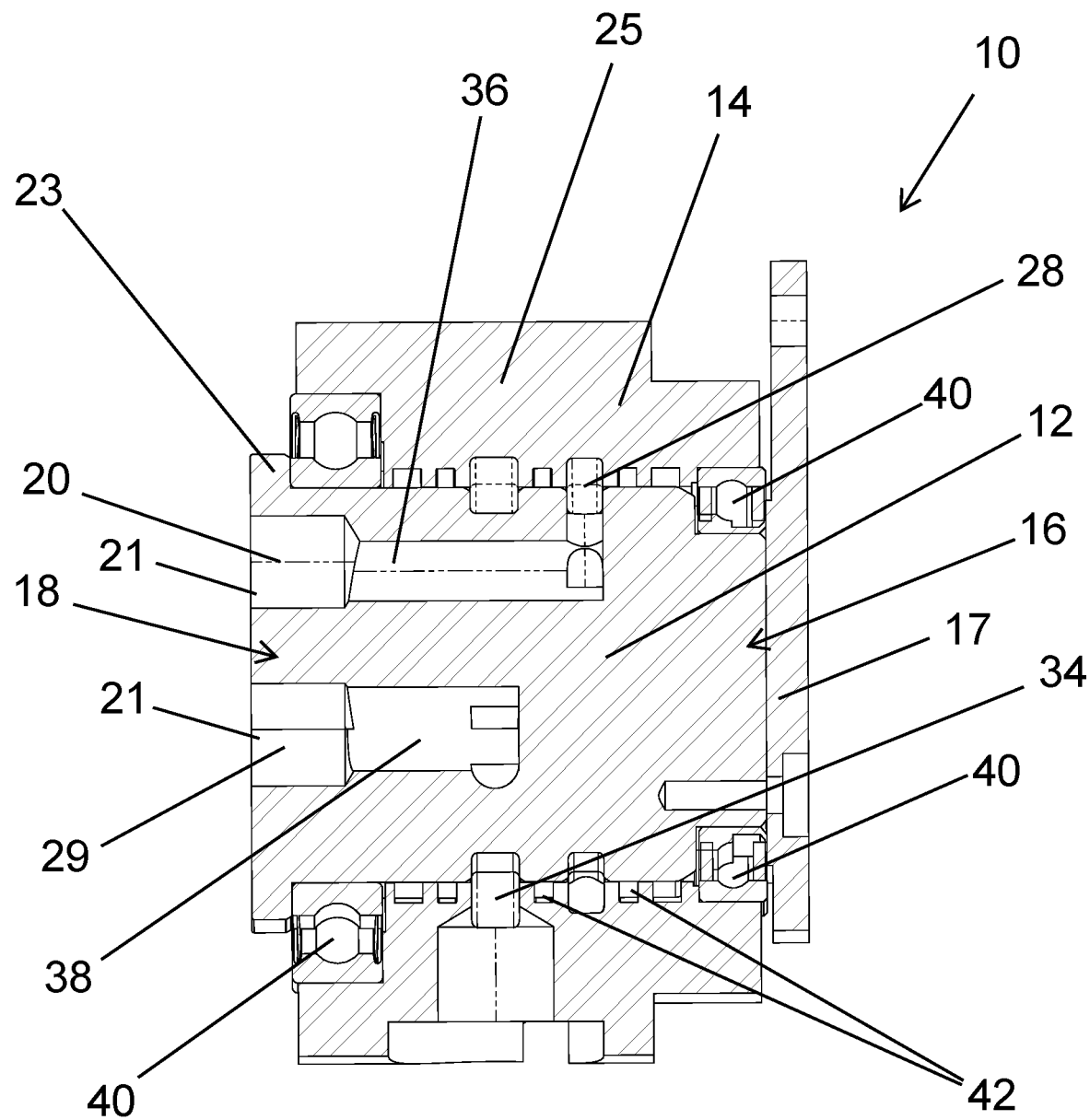
FIG. 5 is a cross sectional view along lines A-A of FIG. 3.

Referring to FIGS. 2 and 5, inner body 12 is generally cylindrical in shape and includes a first end 16 and a second end 18. First end 16 is opposite to second end 18.

Figure 4:
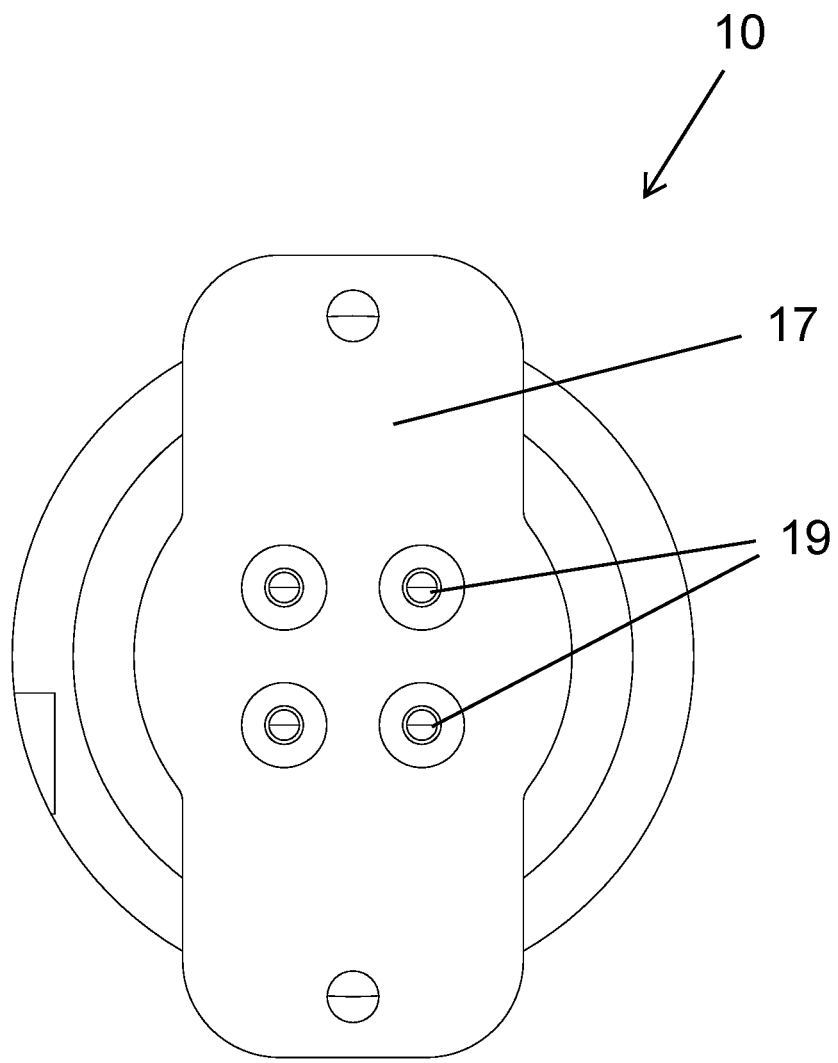
FIG. 4 is a right side view of the swivel connector shown in FIG. 1.

Referring to FIGS. 4 and 5, a mounting plate 17 is fastened to the inner body 12 at first end 16. Mounting plate 17 is mounted to the inner body 12 at first end 16 with one or more bolts 19 or any other suitable fasteners. Mounting plate 17 includes one or more apertures that may be used to mount swivel connector 10 to the desired industrial or commercial installation. Accordingly, it is to be understood by a person skilled in the art that mounting plate 17 may be of any desired shape, size and constitution as may be suitable for the desired application.

Referring to FIG. 5, the inner body 12, at its second end 18, includes a flange 23. Inner body 12 defines an inner port, such as a first inner port 20 and a second inner port 29, at its second end 18. Each of first inner port 20 and second inner port 29 is for receiving a first fluid connection. The first fluid connection may be any connective joint or hose that permits the transmission of fluids, such as a first hose adaptor (not shown). First inner port 20 is spaced apart from second inner port 29. Both first inner port 20 and second inner port 29 are apertures 21 in inner body 12. Apertures 21 are sized and shaped to receive first hose adaptor (not shown). First inner port 20 and/or second inner port 29 may have grooves or ridges along its outer perimeter that enables it to connect with hose fittings, connectors or couplers. First inner port 20 and second inner port 29 may also be manufactured with a built-in first fluid connection (not shown), such as a hose fitting, coupler or any other suitable connector. Such a built-in first fluid connection (not shown) may then be further connected to another fluid connection, such as a hose. Accordingly, first fluid connection may be a corresponding hose fitting, connector, coupler, or a hose for transmitting fluid. In this first embodiment, the preferred first fluid connection is the hose adaptor (not shown) and hose (not shown) suitable for transmitting hydraulic fluids. Further, while in this first embodiment, swivel connector 10 is shown with two inner ports (i.e., first inner port 20 and second inner port 29), it will be understood by a person skilled in the art that there may be just one inner port or more than two inner ports. The number of inner ports is adjustable to match the desired number of outer ports for the desired application and use.

Referring to FIGS. 2 and 5, outer body 14 is captively rotatable about inner body 12. Outer body 14 is generally cylindrical in shape with a hollow center and open ends. As illustrated in FIG. 5, outer body 14 has a wall 25 with varying thicknesses throughout. Outer body 14 is held captive to inner body 12 by flange 23 at second end 18 and by mounting plate 17 attached to inner body 12 at first end 16. However, it is to be understood by a person skilled in the art that outer body 14 may be held captive to inner body 12 by any other suitable means, for example, by mounting mounting plates 17 to inner body 12 at both first end 16 and second end 18, by utilizing an outer body 14 with a different shape, or by any other suitable means.

Figure 6A:
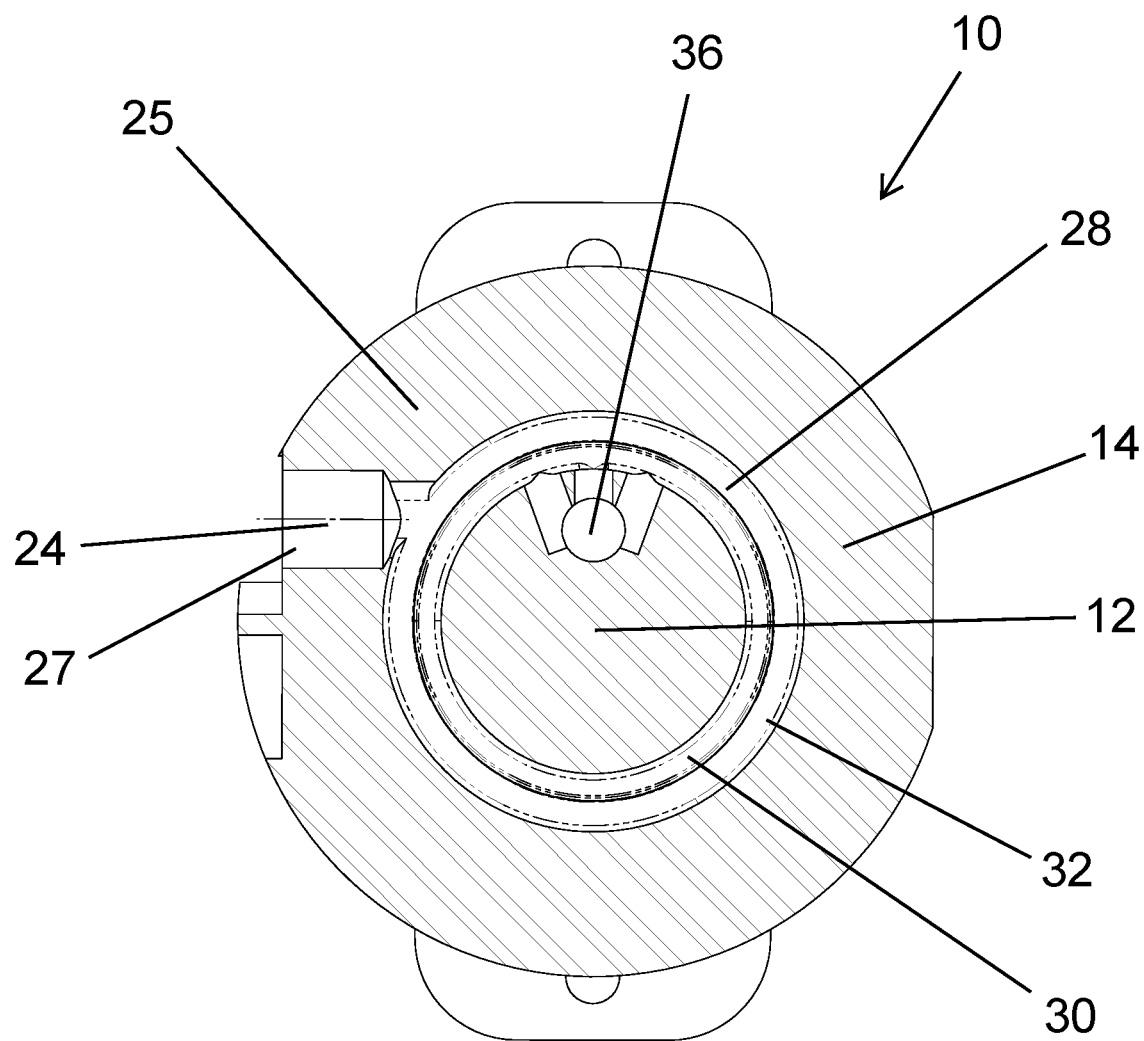
FIG. 6A is a cross sectional view along lines B-B of FIG. 2.
Figure 6B:
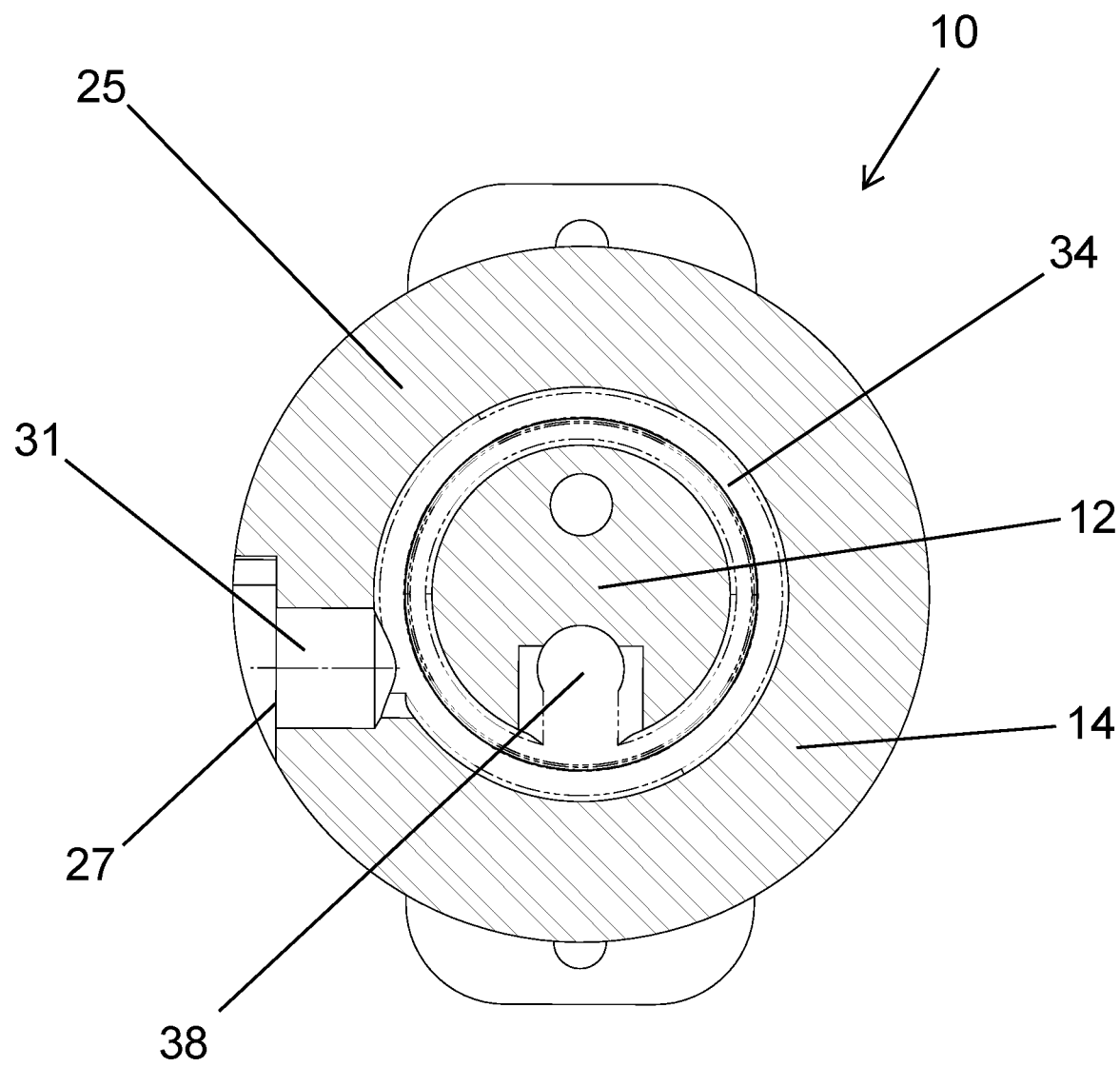
FIG. 6B is a cross sectional view along lines C-C of FIG. 2.
Figure 7:
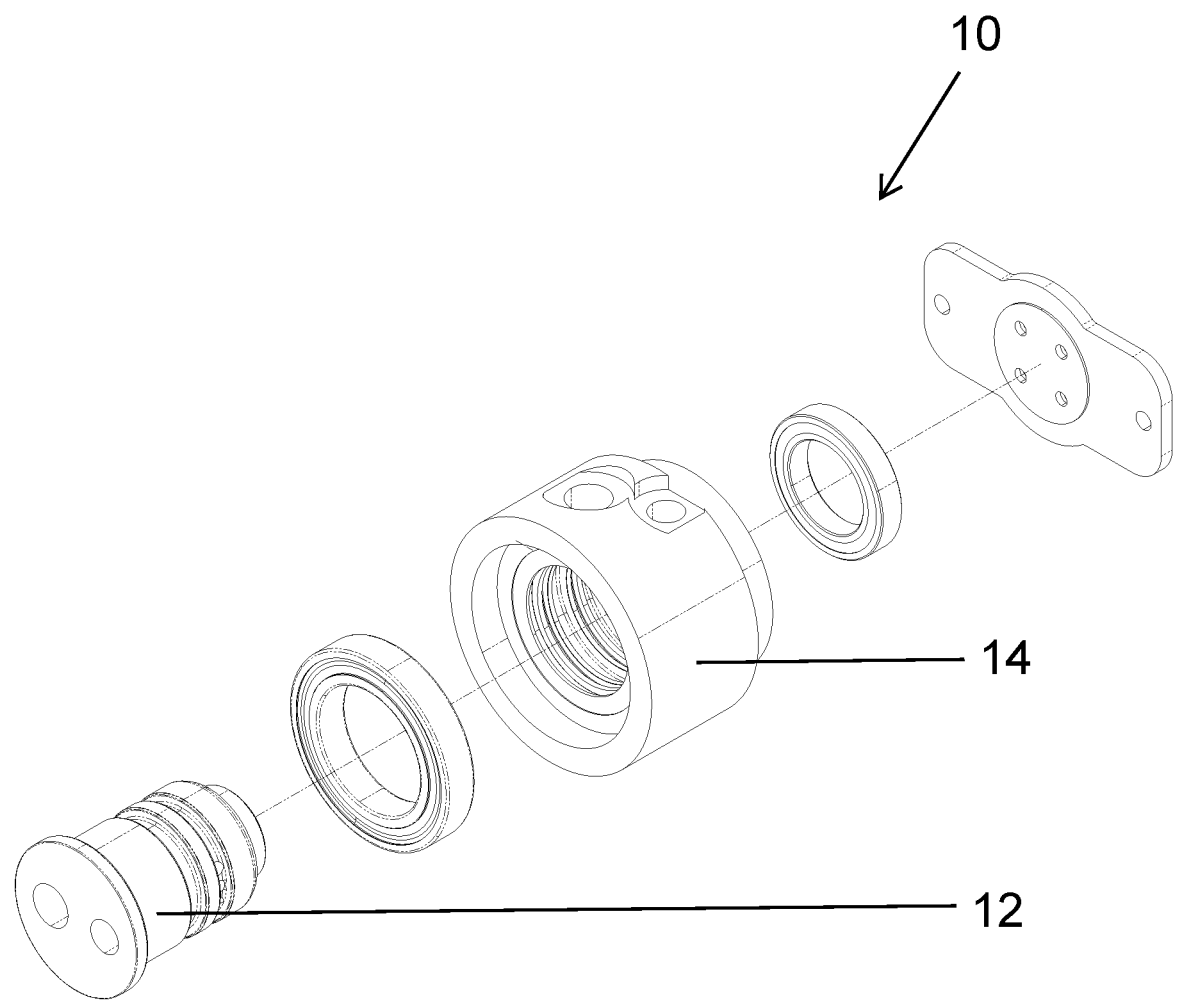
FIG. 7 is an exploded view of the swivel connector shown in FIG. 1.

Referring to FIGS. 2, 6A and 6B, outer body 14 defines an outer port, such as a first outer port 24 and a second outer port 31 for receiving a second fluid connection. The second fluid connection may be any connective joint or hose that permits the transmission of fluids, such as a second hose adaptor (not shown). First outer port 24 is spaced apart from second outer port 31. Outer port 24 and second outer port 31 are apertures 27 that extend through wall 25 of outer body 14. Apertures 27 are sized and shaped to receive the second fluid connection. First outer port 24 and/or second outer port 31 may have grooves or ridges along its outer perimeter that enables it to connect with hose fittings, connectors or couplers. First outer port 24 and second outer port 31 may be manufactured with a built-in second fluid connection (not shown), such as a hose fitting, coupler or any other suitable connector. Such a built-in second fluid connection (not shown) may then be further connected to another second fluid connection (not shown), such as a hose. Accordingly, second fluid connection may be a corresponding hose fitting, connector, coupler, or a hose for transmitting fluid. In this first embodiment, the preferred second fluid connection is a hose adaptor (not shown) and hose (not shown) suitable for transmitting hydraulic fluids. While in this first embodiment, swivel connector 10 is shown with two outer ports (i.e., first outer port 24 and second outer port 31), it will be understood by a person skilled in the art that there may be just one outer port or more than two outer ports. The number of outer ports is adjustable to match the desired number of inner ports for the desired application and use.

Referring to FIG. 6A, inner body 12 and outer body 14 cooperatively define an annular passage, such as first annular passage 28 and second annular passage 34, therebetween. Inner body 12 defines a first annular groove 30 and outer body 14 defines a second annular groove 32. First annular groove 30 and second annular groove 32 cooperatively define first annular passage 28. The cross-sectional shape of each of first annular groove 30 and second annular groove 32 is semi-circular. First annular groove 30 and second annular groove 32 are aligned with each other and open-faced towards each other so as to form first annular passage 28. First annular passage 28 is ring-like and circumscribes inner body 12. Similarly, referring to FIG. 6B, inner body 12 and outer body 14 cooperatively define second annular passage 34, spaced apart from first annular passage 28. While in this first embodiment, swivel connector 10 is shown with two annular passages (i.e., first annular passage 28 and second annular passage 34), it will be understood by a person skilled in the art that there may be just one annular passage, or more than two annular passages. The number of annular passages is adjustable to match the desired number of outer ports and inner ports. It is to be further understood that while first annular passage 28 and second annular passage 34 are shown to be formed of first annular groove 20 and second annular groove 32 (being two equal semi-circular grooves), first annular passage 28 and second annular passage 34 may have different shapes (e.g., could be rectangular, triangular, etc.) and/or sizes (e.g., first annular groove 20 may be larger than second annular groove 32 or vice versa) and/or may be formed by a singular cutout in outer body 14 or inner body 12 (as opposed to being disposed between outer body 14 and inner body 12), provided that the passageways can still extend through to the annular groove(s).

Referring to FIGS. 5 and 6A, first inner port 20 extends within inner body 12 to first annular passage 28 and first outer port 24 extends within outer body 14 to first annular passage 28 so as to form a passageway, such as first passageway 36. First passageway 36 is operable to permit a flow of fluid between inner port 20 and outer port 24. Referring to FIGS. 5 and 6B, second inner port 29 extends within inner body 12 to second annular passage 34 and second outer port 31 extends within outer body 14 to second annular passage 34 so as to form a second of the passageway, such as a second passageway 38. Second passageway 38 is operable to permit a flow of fluid between second inner port 29 and second outer port 31. First passageway 36 is spaced apart from second passageway 38. As illustrated in this first embodiment, second outer port 31, second annular passage 34, second passageway 38, and second inner port 29 are larger than first outer port 24, first annular passage 28, first passageway 36, and first inner port 20, respectively. However, the size of the passageways may also vary between each passageway as well as within each passageway. For example, first passageway 36 may be larger than second passageway 38 throughout, and second annular passage 34 may be larger than second passageway 38. Further, while in this first embodiment, swivel connector 10 is shown with two passageways (i.e., first passageway 36 and second passageway 38), it will be understood by a person skilled in the art that there may be just one passageway, or more than two passageways. The number of passageways is adjustable to match the desired number of outer ports and inner ports. Further, as illustrated, first passageway 36 and second passageway 38 each include one right-angle bend, however, it will be understood by a person skilled in the art that the passageways may have any shape or form as desired so long as it connects the inner ports to the outer ports, respectively.

Referring to FIG. 5, swivel connector 10 includes one or more bearings 40 disposed between inner body 12 and outer body 14. Bearings 40 facilitates the rotatability of outer body 14 around inner body 12. As illustrated, bearings 40 are ball bearings, however, it will be understood by a person skilled in the art that bearings 40 may be in any other suitable form. Swivel connector 10 also includes one or more circumferential seals 42 for sealing first annular passage 28 and second annular passage 34. Seals 42 may be of any suitable size, shape, or constitution to suit the desired application and use. For example, seals 42 may be a lip seal, a mechanical seal, or any other suitable seal.

Figure 8:
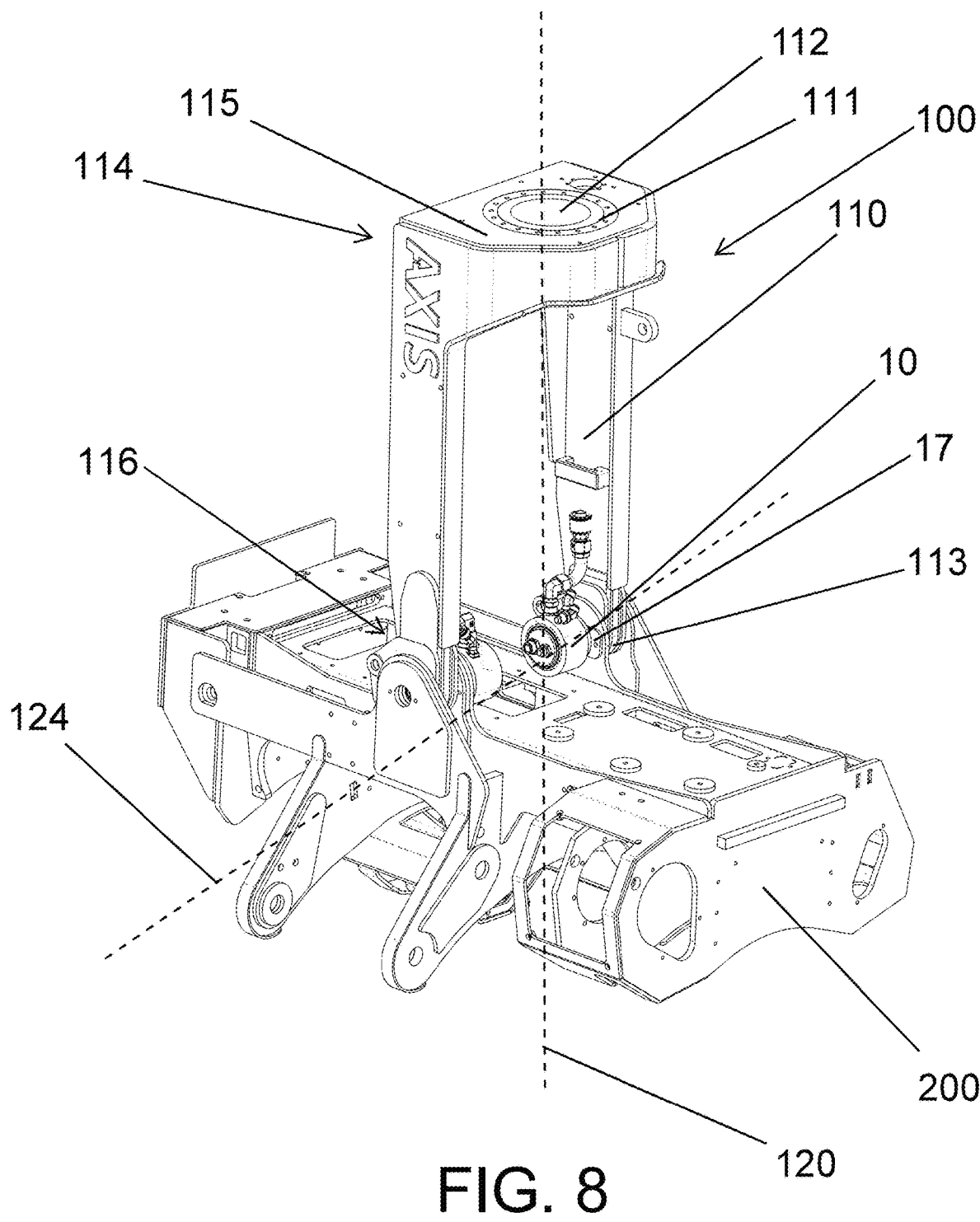
FIG. 8 is a front perspective view of a forestry apparatus employing the swivel connector of FIG. 1.

Referring to FIG. 8, there is an apparatus 100 for mounting a forestry processor head 200 to a boom (not shown). Apparatus 100 includes: swivel connector 10; a support 110; a second swivel connector 112; a first mounting mechanism 111; and a second mounting mechanism 113. Support 110 has a first support end 114 and a second support end 116. Support 110 includes a frame 115 at first support end 114. Frame 115 is used for mounting second swivel connector 112 or any other suitable swivel connector. Support 110 includes two support arms 118 at second support end 116.

Second swivel connector 112 is rotatably mounted to support 110 at first support end 114. Second swivel connector 112 is rotatable about a first axis 120. Second swivel connector 112 permits support 110 to pivot about first axis 120. Swivel connector 10 is mounted to support 110 at second support end 116 via mounting plate 17. Swivel connector 10 is rotatable about a second axis 124. Second axis 124 is perpendicular to first axis 120.

First mounting mechanism 111 is connected to second swivel connector 112 for mounting second swivel connector 112 to boom (not shown). First mounting mechanism 111 may be any industrial grade coupling device, or any other suitable mounting mechanism.

Second mounting mechanism 113 is connected to support 110 at second support end 116. Second mounting mechanism 113 is used for pivotally mounting forestry processor head 200 to support 110 at second support end 116. Second mounting mechanism 113 may be any coupling mechanism or structure suited to be used with the desired forestry processor head 200.

Hydraulic hoses (not shown) may be connected to the outer ports and the inner ports, such that the hydraulic hose (not shown) connected to first outer port 24 of swivel connector 10 may freely rotate about second axis 124. Second swivel connector 112 permits a first connected hose (not shown) to swivel about first axis 120, and swivel connector 10 permits a second connected hose (not shown) to swivel about second axis 124.

Second Embodiment

Figure 9A:
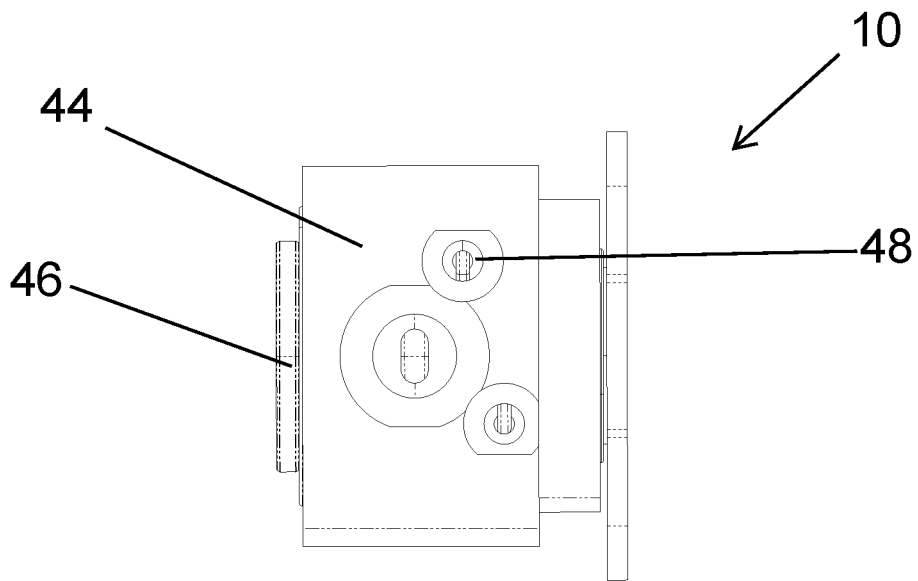
FIG. 9A is a front view of a swivel connector according to a second embodiment of the invention.
Figure 9B:
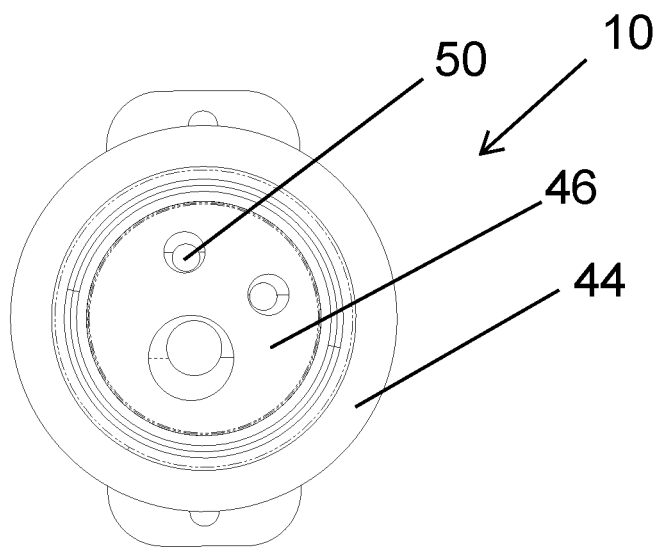
FIG. 9B is a left side view of the swivel connector shown in FIG. 9A.

Referring to FIGS. 9A and 9B, a second embodiment of the present invention is shown. In this embodiment, an outer body, such as a second outer body 44 is captive to an inner body, such as a second inner body 46. Second outer body 44 includes an additional outer port, such as third outer port 48. Second inner body 46 includes an additional inner port, such as third inner port 50. Second outer body 44 and second inner body 46 cooperatively define an additional annular passage, such as third annular passage (not shown).

Third inner port 48 extends within second inner body 46 to third annular passage (not shown) and third outer port 48 extends within second outer body 44 to third annular passage (not shown) so as to form a third of the passageway, such as a third passageway (not shown). Third passageway (not shown) is operable to permit a flow of fluid between third inner port 50 and third outer port 48. Third passageway (not shown) is spaced apart from both first passageway 36 and second passageway 38.

Third Embodiment

Referring to FIGS. 10A to 10E, a third embodiment of the present invention is shown. In this embodiment, an outer body, such as a third outer body 56 is captive to an inner body, such as an annular inner body 58. Third outer body 56 is captive to annular inner body 58 via generally the shape of third outer body 56. Third outer body 56 is in the shape of a hollow cylinder having an open tapered end 60. Such a shape encases annular inner body 58 except at open tapered end 60 of third outer body 56, whereby annular inner body 58 protrudes and extends beyond third outer body 56. At open tapered end 60 of third outer body 56, there may be an overhanging lip (not shown), a tongue and groove mechanism (not shown) or any other suitable mechanism used for holding third outer body 56 captive to annular inner body 58 at open tapered end 60 of third outer body 56. Third outer body 56 further includes a wire port 70. Wire port 70 is an aperture extending through third outer body 56.

Annular inner body 58 has a first end 62 and a second end 66. Second end 66 is opposite to first end 62. Annular inner body 58 includes a longitudinal cutout 64 through its center that extends from its first end 62 to its second end 66. A right-angle guide 78 extends from longitudinal cutout 64 at first end 62 of annular inner body 58 to wire port 70. Longitudinal cutout 64, right-angle guide 78 and wire port 70 form a wire passage 82. Wire passage 82 permits an electrical wire (not shown) to pass through swivel connector 10. Annular inner body 58 at its second end 66 includes one or more inner ports, such as fourth inner port 68 and fifth inner port 72. A mounting plate, such as second mounting plate 74 is mounted to annular inner body 58 at its second end 66. Second mounting plate 74 defines a number of inner apertures 76 and outer apertures 80. As illustrated, there are three inner apertures 76, each of which are aligned with each of fourth inner port 68, fifth inner port 72 and longitudinal cutout 64 at second end 66 of annular inner body 58. Outer apertures 80 of mounting plate 74 may be used to mount annular inner body 58 to the desired industrial or mechanical installation.

Figure 10A:
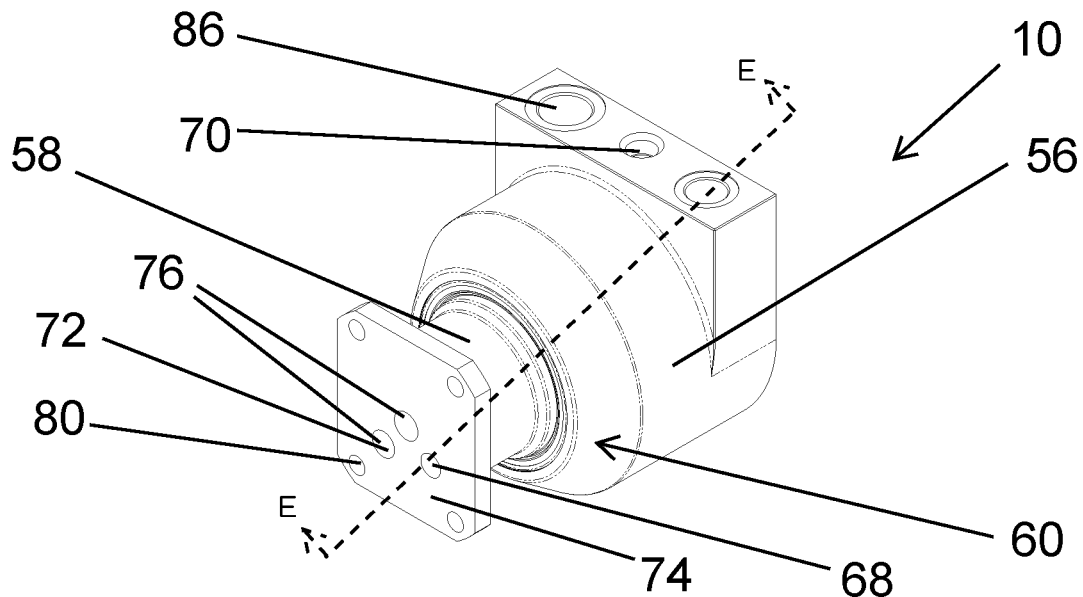
FIG. 10A is a perspective left side view of a swivel connector according to a third embodiment of the invention.
Figure 10B:
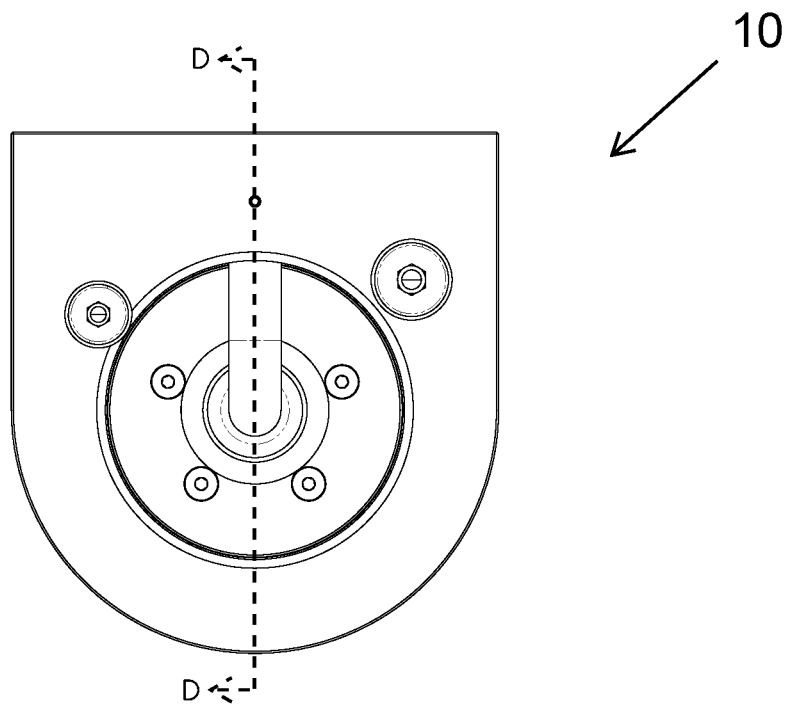
FIG. 10B is a right side view of the swivel connector shown in FIG. 10A.
Figure 10C:
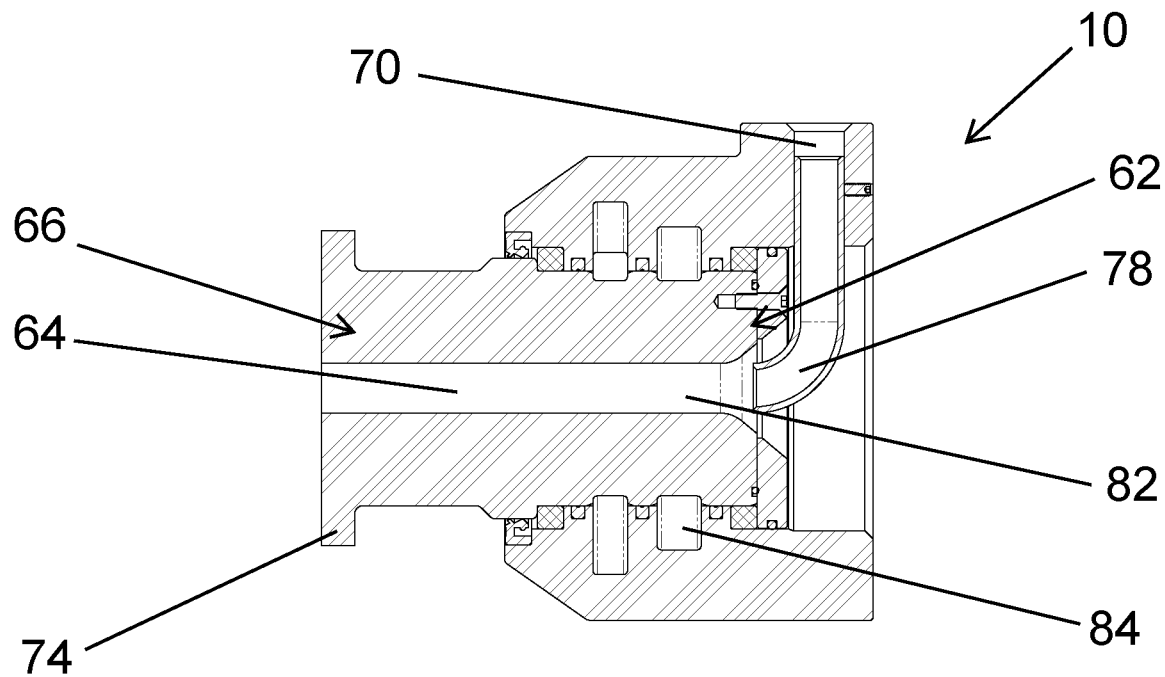
FIG. 10C is a cross sectional view along lines D-D of FIG. 10B.
Figure 10D:
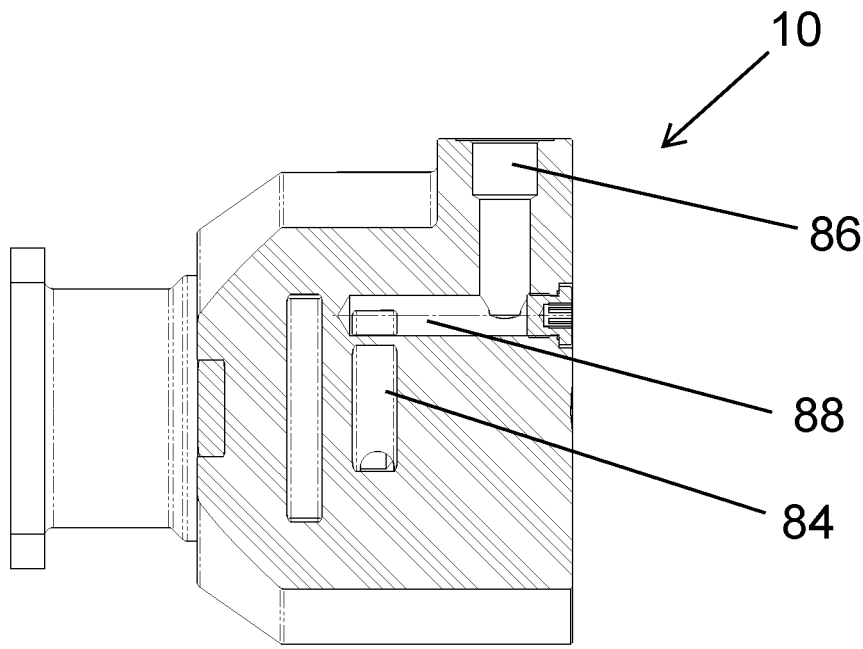
FIG. 10D is a cross sectional view along lines E-E of FIG. 10A.
Figure 10E:
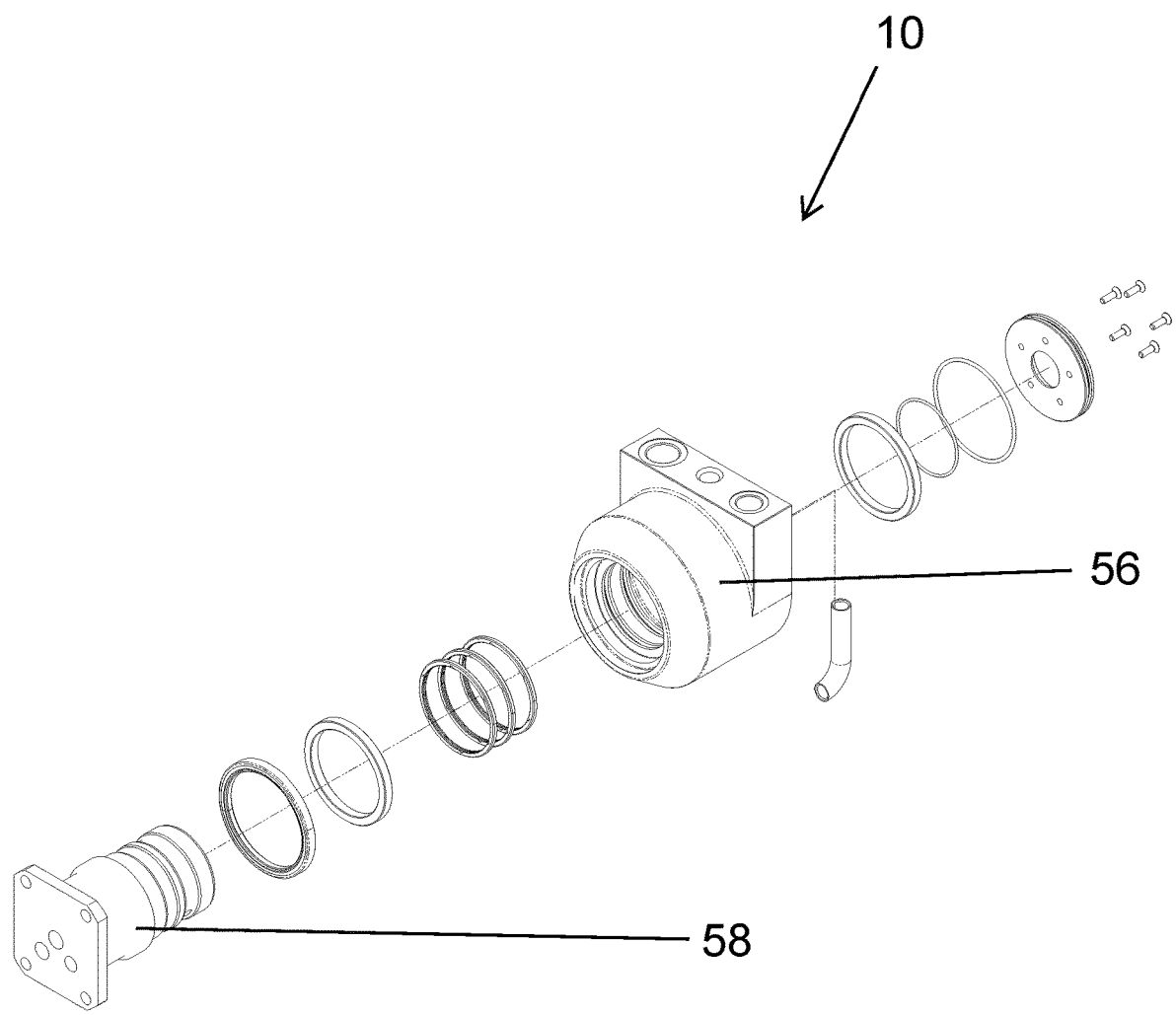
FIG. 10E is an exploded view of the swivel connector shown in FIG. 10A.

Referring to FIGS. 10A and 10D, fourth inner port 68 extends within annular inner body 58 to an annular passage, such as fourth annular passage 84, and an outer port, such as fourth outer port 86, extends within third outer body 56 to fourth annular passage 84 so as to form a passageway, such as fourth passageway 88. Fourth passageway 88 includes three right-angle bends (not shown).

While embodiments of the invention have been described and illustrated, such embodiments should be considered illustrative of the invention only. The invention may include variants not described or illustrated herein in detail. Thus, the embodiments described and illustrated herein should not be considered to limit the invention as construed in accordance with the accompanying claims.

What is claimed is:

1. An apparatus for mounting a forestry processor head to a boom, the apparatus comprising:
    a support having a first support end and a second support end;
    a swivel connector comprising:
        an inner body having a first end and a second end opposite to the first end, the inner body defining an inner port at the second end for receiving a first fluid connection; and
        an outer body captively rotatable about the inner body, the outer body defining an outer port for receiving a second fluid connection, the outer port being orthogonal to the inner port, the inner body and the outer body cooperatively defining an annular passage therebetween, the inner port extending within the inner body to the annular passage and the outer port extending within the outer body to the annular passage so as to form a passageway operable to permit a flow of fluid between the inner port and the outer port; and
    a second said swivel connector pivotally mounted to the support at the first support end, the second swivel connector being rotatable about a first axis;
    wherein the swivel connector is mounted to the support at the second support end, the swivel connector being rotatable about a second axis perpendicular to the first axis.

2. The apparatus of claim 1, further comprising:
    a first mounting mechanism connected to the second swivel connector for mounting the second swivel connector to the boom; and
    a second mounting mechanism connected to the support at the second support end for pivotally mounting the forestry processor head to the support at the second support end.

3. The apparatus of claim 1, wherein:
    the inner body further defines a second said inner port spaced apart from the inner port,
    the outer body further defines a second said outer port spaced apart from the outer port, and
    wherein the inner body and the outer body cooperatively define a second said annular passage spaced apart from the annular passage so as to form a second said passageway between the second inner port and the second outer port.

4. The apparatus of claim 1, wherein the inner body defines a first annular groove and the outer body defines a second annular groove, the first and second annular grooves defining the annular passage.

5. The apparatus of claim 3, wherein the second outer port, the second annular passage, the second passageway, and the second inner port are larger than the outer port, the annular passage, the passageway, and the inner port, respectively.

6. The apparatus of claim 1, wherein the passageway includes a right-angle bend.

7. The apparatus of claim 1, further comprising one or more bearings disposed between the inner body and the outer body.

8. The apparatus of claim 1, further comprising one or more circumferential seals for sealing the annular passage.

9. The apparatus of claim 1, further comprising a mounting plate removably attachable to the inner body.

10. The apparatus of claim 9, wherein the mounting plate is removably attached to the inner body at the first end, the inner body defines a flange at the second end, and wherein the mounting plate and the flange cooperatively render the outer body captive to the inner body.

11. The apparatus of claim 1, wherein the inner body further defines a longitudinal cutout extending from the first end to the second end, the outer body further defines a wire port, the longitudinal cutout and the wire port operable to permit an electrical wire to pass through the swivel connector.

12. The apparatus of claim 11, further comprising a guide extending from the longitudinal cutout at the first end of the inner body to the wire port.

13. The apparatus of claim 12, wherein the guide has a right-angle bend.

14. The apparatus of claim 1, wherein each of the first and second fluid connections comprises a hose coupling.

* * * * *